United States Patent
Rashid-Farrokhi et al.

(10) Patent No.: US 6,876,725 B2
(45) Date of Patent: *Apr. 5, 2005

(54) SINGLE ENDED LINE PROBING IN DSL SYSTEM

(75) Inventors: Farrokh Rashid-Farrokhi, Pleasanton, CA (US); Jalil Kamali, San Jose, CA (US)

(73) Assignee: Centillium Communications, Inc., Fremont, CA (US)

(*) Notice: Subject to any disclaimer, the term of this patent is extended or adjusted under 35 U.S.C. 154(b) by 195 days.

This patent is subject to a terminal disclaimer.

(21) Appl. No.: 10/115,503

(22) Filed: Apr. 2, 2002

(65) Prior Publication Data

US 2002/0172329 A1 Nov. 21, 2002

Related U.S. Application Data

(63) Continuation-in-part of application No. 09/853,048, filed on May 9, 2001, now Pat. No. 6,668,041.
(60) Provisional application No. 60/303,330, filed on Jul. 5, 2001.

(51) Int. Cl.[7] ............. H04M 1/24; H04M 3/08; H04M 3/22
(52) U.S. Cl. ............. 379/1.04; 379/1.01; 379/22.02; 379/24; 379/30
(58) Field of Search ............. 329/1.01, 1.03, 329/1.04, 3, 22.01, 22.02, 22.03, 22.04, 22.08, 23, 24, 26.01, 27.03, 29.01, 30; 324/500, 525, 527, 534, 535

(56) References Cited

U.S. PATENT DOCUMENTS

| | | |
|---|---|---|
| 4,105,995 A | 8/1978 | Bothof et al. |
| 4,870,675 A | 9/1989 | Fuller et al. |
| 5,083,086 A | 1/1992 | Steiner |

(Continued)

FOREIGN PATENT DOCUMENTS

| | | |
|---|---|---|
| CA | 2281208 A1 | 2/2001 |
| EP | 0 391 312 A2 | 10/1990 |
| EP | 1 014 658 A2 | 6/2000 |
| EP | 1 073 247 A2 | 1/2001 |
| EP | 1 081 924 A2 | 3/2001 |
| WO | WO 00/27134 | 5/2000 |
| WO | WO 01/01158 A1 | 1/2001 |
| WO | WO 01/24492 A1 | 4/2001 |

OTHER PUBLICATIONS

PCT International Search Report, International Application No. PCT/US02/14470, Aug. 29, 2002, 4 pages.

Hedlund et al., "DSL Loop Test," *Telephony*, Chicago, IL, vol. 235, No. 8, pp. 48–52, Aug. 24, 1998.

Baker et al., "Telephone Access Network Measurements," 1998, 81 pages.

(Continued)

*Primary Examiner*—Quoc Tran
(74) *Attorney, Agent, or Firm*—Fenwick & West LLP

(57) ABSTRACT

SELP techniques that provide an accurate estimate of the length of a transmission medium (e.g., subscriber loop in a DSL system) are disclosed. A probe signal is transmitted over the transmission medium at one or more frequencies. A reflected version of the probe signal is then received. Transmission medium impedance is determined based on the ratio of the reflected version of the probe signal and the transmitted probe signal. An estimate of transmission medium length is determined by comparing its impedance to a plurality of predetermined impedances, each of which is associated with a transmission medium having known length. Thus, the length of the systems transmission medium is identified. The transmission medium impedance can also be used to identify the presence of load coils and short circuits in the transmission medium.

32 Claims, 8 Drawing Sheets

U.S. PATENT DOCUMENTS

| | | | |
|---|---|---|---|
| 5,128,619 A | | 7/1992 | Bjork et al. |
| 5,461,318 A | | 10/1995 | Borchert et al. |
| 5,864,602 A | | 1/1999 | Needle |
| 5,881,130 A | * | 3/1999 | Zhang ................ 379/27.08 |
| 6,002,671 A | | 12/1999 | Kahkoska et al. |
| 6,084,946 A | * | 7/2000 | Beierle ................ 379/30 |
| 6,091,713 A | | 7/2000 | Lechleider et al. |
| 6,177,801 B1 | | 1/2001 | Chong |
| 6,215,855 B1 | | 4/2001 | Schneider ................ 379/22 |
| 6,256,377 B1 | | 7/2001 | Murphree et al. |
| 6,266,395 B1 | | 7/2001 | Liu et al. |
| 6,385,297 B2 | | 5/2002 | Faulkner et al. |
| 6,434,221 B1 | | 8/2002 | Chong |
| 6,456,694 B1 | | 9/2002 | Posthuma |
| 6,466,649 B1 | | 10/2002 | Walance et al. |
| 6,487,276 B1 | | 11/2002 | Rosen et al. |
| 6,531,879 B1 | | 3/2003 | Nero, Jr. |
| 6,538,451 B1 | | 3/2003 | Galli et al. |
| 6,658,051 B1 | * | 12/2003 | Liu ................ 375/222 |
| 6,668,041 B2 | | 12/2003 | Kamali et al. |
| 2002/0176490 A1 | * | 11/2002 | Kamali et al. ........ 375/222 |
| 2003/0026391 A1 | * | 2/2003 | Kamali et al. ........ 379/27.01 |

OTHER PUBLICATIONS

Boets et al., "The Modelling Aspect of Transmission Line Networks," Proceedings of the Instrumentation and Measurement Technology Conference, New York, May 12–14, 1992, IEEE, pp. 137–141.

Ziemann, "ADSL Line Qualification Tests," Application Note 52, Wandel & Goltermann Communications Test Solutions, Sep. 28, 2000, pp. 1–5.

PCT International Search Report, International Application No. PCT/US02/21057, Nov. 14, 2002, 4 pages.

PCT Written Opinion, International Application No. PCT/US02/14470, Apr. 15, 2003, 6 pages.

PCT International Search Report, International Application No. PCT/US02/21000, Mar. 13, 2003, 5 pages.

PCT International Search Report, International Application No. PCT/US03/04614, May 16, 2003, 6 pages.

* cited by examiner

SINGLE ENDED LINE PROBING IN DSL SYSTEM

CROSS-REFERENCE TO RELATED APPLICATIONS

This application claims the benefit of U.S. Provisional Application No. 60/303,330, filed Jul. 5, 2001, which is incorporated by reference herein, and is a continuation-in-part of U.S. patent application Ser. No. 09/853,048, filed May 9, 2001 now U.S. Pat. No. 6,668,041. Each of these applications is incorporated by reference herein.

BACKGROUND

1. Field of the Invention

The present invention is related to the field of telecommunications, and in particular, to estimating the length of a transmission medium (e.g., subscriber loop in a DSL system).

2. Background

DSL communications use copper phone lines (e.g., twisted pair) for high-speed data transmission. A major problem for DSL service providers is to accurately qualify a subscriber's local loop (sometimes referred to as probing the line) prior to the deployment of DSL service. In general, line probing involves measuring line parameters such as loop capacitance and loop resistance. A typical approach for probing the line requires a first handset to be attached to one end of a telephone line at the telephone company's Central Office (CO) location and a second handset to be attached to the other end of the telephone line at the customer premises equipment (CPE) location. Thus, human interaction is required at two points of the telephone line, including a service call to the CPE location, which increases the cost of deployment. Single ended line probing (SELP) techniques eliminate the need for a service call to the CPE location and the additional costs of such service.

Conventional SELP techniques use a resistor-capacitor (RC) circuit model to estimate the length of a transmission medium, as shown in FIG. 1A. The RC circuit model typically includes the known source resistance $R_s$ of the line and the unknown line capacitance $C_1$. The line capacitance is approximately proportional to the length L of the transmission medium. A Direct Current (DC) pulse is applied to the line and the charge-up time $t_c$ is monitored. This function is sometimes provided on a digital multimeter. Once the charge-up time is known (and given a value for $R_s$), the line capacitance $C_1$ can be estimated along with the line length. FIG. 1B is a graph illustrating the voltage across the line capacitance $C_1$ as a function of time.

Unfortunately, such probing technique cannot be employed in a typical CO DSL modem. Conventional DSL modem boards typically include a line transformer to isolate the line from the CO equipment and reject the common mode voltage of the line. Due to the presence of the line transformer, a DC pulse cannot be transmitted onto the line. Additionally, a typical CO DSL modem includes extensive high pass filtering for blocking out low frequency signals, including any low frequency line-probing signals. Furthermore, the resistance of the RC circuit model typically includes the source resistance $R_s$, but ignores the line resistance. This is a reasonable approximation of the resistance when the source resistance is much larger than the line resistance. In conventional DSL modem boards, however, the output resistance of the source is typically not significantly larger than the line resistance. As such, ignoring the line resistance degrades the accuracy of the loop length estimate.

Accordingly, there is a need for an improved SELP technique that is suitable for use with typical DSL modems and that can provide an accurate estimate of transmission line length.

SUMMARY

The present invention provides a SELP technique for accurately estimating the length of a transmission medium in a telecommunications system (e.g., subscriber loop in a DSL system). In one embodiment of the present invention, a probing signal is transmitted over the transmission medium at one or more frequencies. A reflected version of the probe signal is then received. Transmission medium impedance is determined based on the ratio of the reflected version of the probe signal and the transmitted probe signal. An estimate of transmission medium length is determined by comparing its impedance to a plurality of predetermined impedances, each of which is associated with a transmission medium having known length. Thus, the length of the transmission medium is identified. The transmission medium impedance can also be used to identify the presence of load coils and short circuits in the transmission medium.

An advantage of the present invention is its compatibility with existing DSL modem hardware, whose transformers typically include line transformers configured to block low frequency signals from accessing the transmission medium.

Another advantage of the present invention is that the transmission medium length can be computed based solely on signals that are readily measurable by the DSL modem hardware.

Still another advantage of the present invention is the use of model fitting at low frequencies, where more information (e.g., line length, number of load coils) is available for long loops (and loop segments beyond coils), compared with high frequency measurements and time domain measurements.

BRIEF DESCRIPTION OF THE DRAWINGS

These and other features, aspects, and advantages of the present invention will become better understood with regard to the following description, appended claims, and accompanying drawings where:

DETAILED DESCRIPTION OF EMBODIMENTS
Description of SELP Device

Figure 1A:
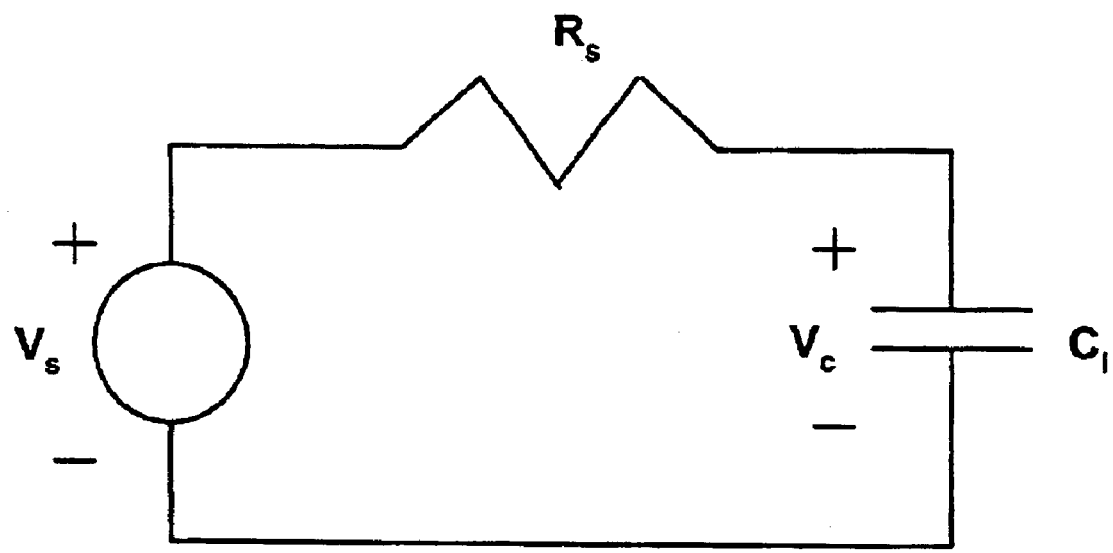
FIG. 1A is a circuit diagram of a prior art RC circuit model.
Figure 1B:
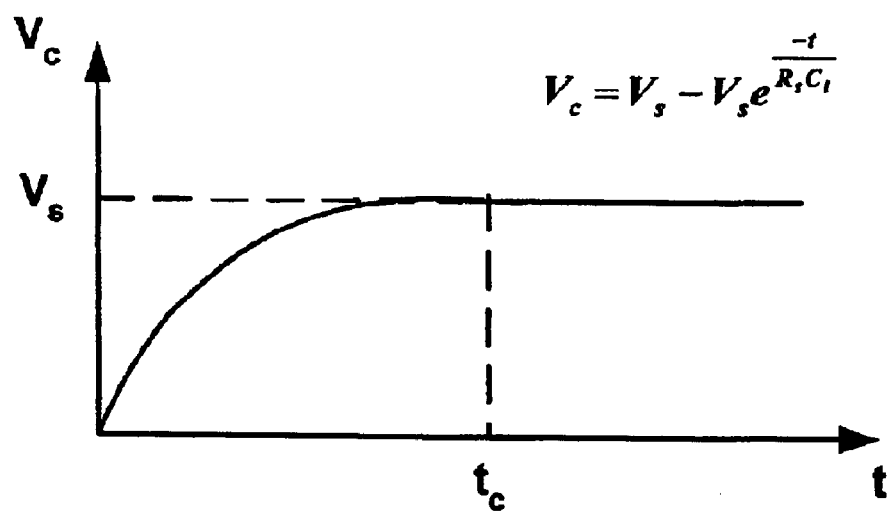
FIG. 1B is a graph showing the step voltage response of the RC circuit model in FIG. 1A.
Figure 2:
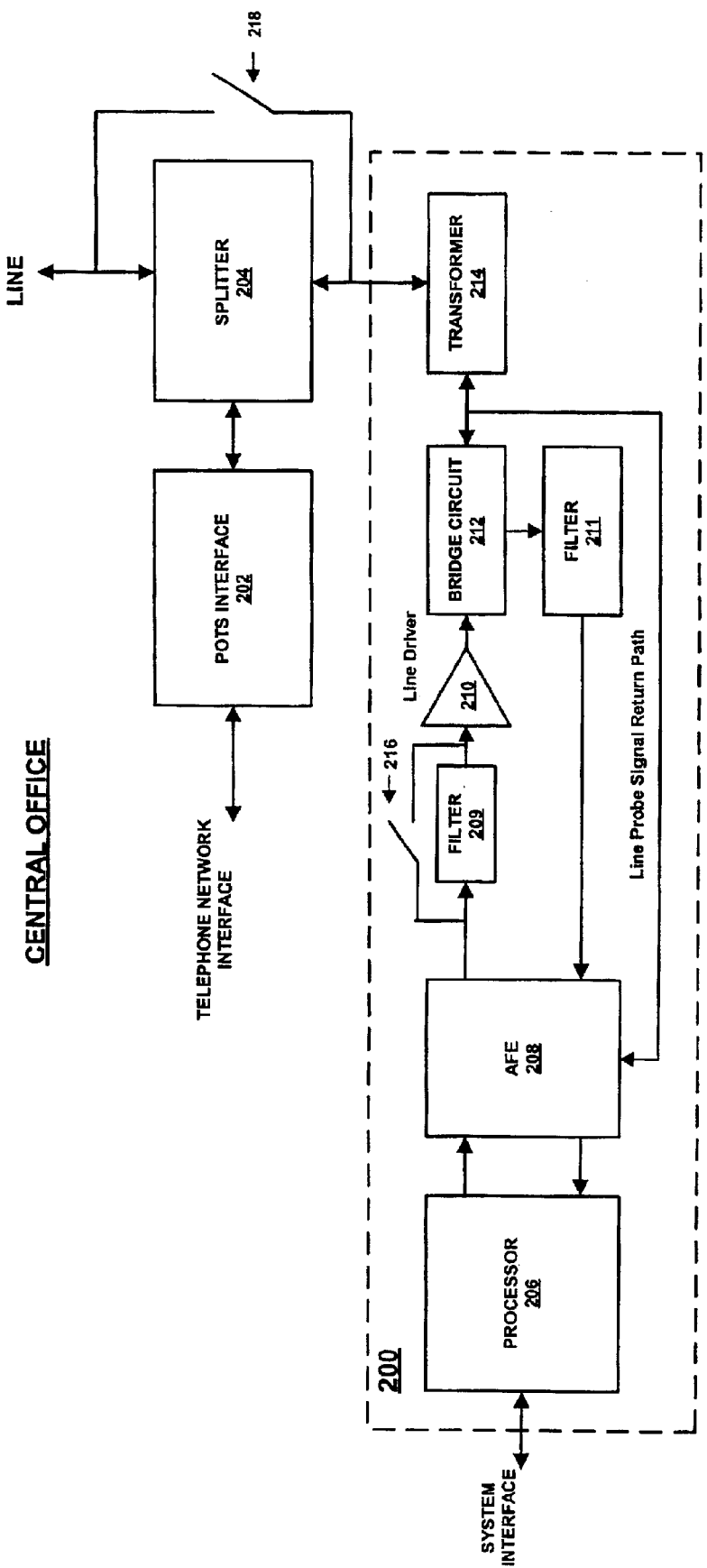
FIG. 2 is a block diagram of a SELP device in accordance with one embodiment of the present invention.

Referring to FIG. 2, there is shown a block diagram of a SELP device 200 (hereinafter also referred to as "modem 200") in accordance with one embodiment of the present invention. The modem 200 generally includes processor 206, analog front end (AFE) 208, filters 209, 211, line driver 210, bridge circuit 212, line transformer 214 and bypass switches 216, 218. The modem 200 can also include other components and features (e.g., filters and other conventional modem modules), which have been omitted from FIG. 2 to avoid obscuring the present invention. Modem 200 can be one of a plurality of DSL modems included on a multiple port assembly (e.g., a line card having 48 individual modems and corresponding ports). Alternatively, modem 200 can be a stand-alone DSL modem or other SELP device, for determining the length of the transmission medium. In the embodiment show, modem 200 is deployed in a central office, and is operatively coupled to the transmission medium by way of a splitter 204, which splitter is also coupled with POTS interface 202.

In the receive direction (e.g., signals entering the CO), incoming analog signals received from the transmission line are split into high and low frequency analog signals by splitter 204, using known filtering techniques. The low frequency Plain Old Telephone Service (POTS) signals are sent to the POTS interface 202, which processes the signals for transmission over a telephone network. The high frequency signals (e.g., DSL data) are sent to the modem 200. At modem 200, the high frequency data signals are received by the transformer 214, which provides electrical isolation between the telephone line and the internal circuitry of modem 200. The data signals enter bridge circuit 212, which performs 2-to-4-wire conversion (e.g., two-wire phone line to a transmit pair and receive pair). The data signals are filtered by filter 211 before being received by the AFE 208, which typically includes an analog-to-digital (A/D) converter and a digital-to-analog (D/A) converter. AFE 208 can also include a gain adjust module for adjusting the level of the data signals. The analog data signals received by the AFE 208 are converted to digital form by the A/D converter and provided to processor 206. When operating in SELP mode, the AFE 208 can receive the data signals directly from the input or output of bridge circuit 212.

The processor 206 is programmed or otherwise configured to affect the principles of the present invention, which is described more fully below. For example, processor 206 is configured to generate control signals for activating bypass switches 216, 218 when operating in SELP mode. The switches 216, 218 are closed during SELP mode to allow low frequency probe signals to enter the transmission medium. The processor 206 is adapted to transmit the probe signals and measure the reflected versions of such probe signals so that characteristics of the transmission line (e.g., transfer function and line impedance) can be determined. Processor 206 may be further adapted to perform other functions, such as scrambling/descrambling, encoding/decoding, error checking, modulation/demodulation and other programmable modem functions (e.g., FFT/DFT algorithms). In one embodiment, processor 206 is a Digital Signal Processor (DSP), but other suitable processing environments can be employed here as well (e.g., microcontroller or microprocessor).

In the transmit direction (e.g., signals leaving the CO), data signals are received by processor 206, for example, from a system interface. Such data signals might originate from a high-speed data network or from another CO located somewhere on the Public Switched Telephone Network (PSTN). The digital output of processor 206 is converted to its analog equivalent by the D/A converter in the AFE 208. The output of AFE 208 is filtered by filter 209 before being provided to the line driver 210, which is coupled to bridge circuit 212. The bridge circuit 212 performs a 4-to-2-wire conversion on the data signals before they are transmitted to the transmission line via splitter 204. Outgoing POTS signals from POTS interface 202 and outgoing high frequency data signals from transformer 214 are combined in the splitter 204 and transmitted over the transmission line.

The modem 200 described above can be used to determine the length of a transmission line based on measurements of line impedance, which measurements can be determined by modeling the line driver 210, bridge circuit 212 and transformer 214 of modem 200 (hereinafter collectively referred to as a "hybrid circuit"), as described below.

Hybrid Circuit

Figure 3:
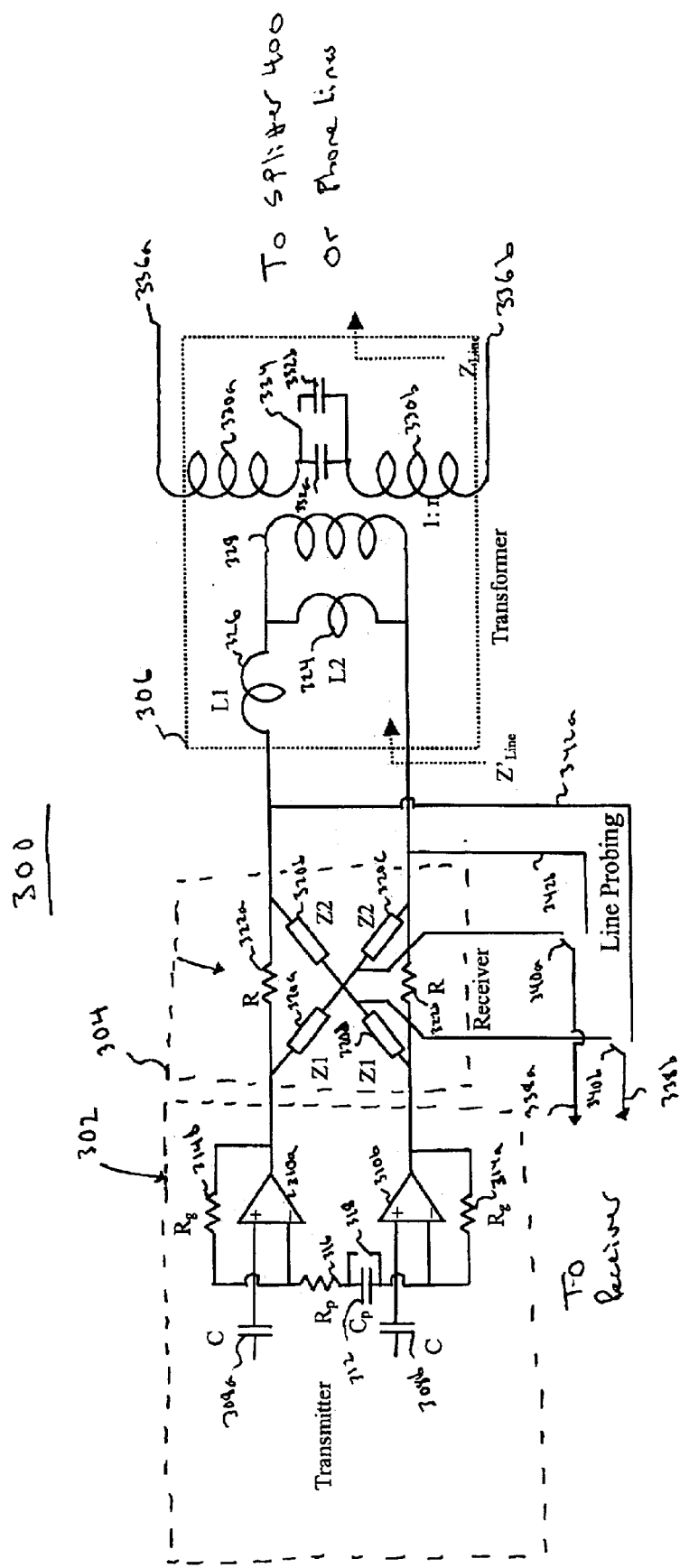
FIG. 3 is a block diagram of a hybrid circuit in accordance with one embodiment of the present invention.

Referring to FIG. 3, there is shown a block diagram a hybrid circuit 300 in accordance with one embodiment of the present invention. The hybrid circuit 300 comprises transmitter 302, bridge circuit 304 and transformer 306. The transmitter 302 comprises DC decoupling capacitors 308a–b (C), line drivers 310a–b, filter capacitor 312 ($C_p$), feedback resistors 314a–b ($R_g$), and filter resistor 316 ($R_p$). A bypass switch 318 is coupled across the filter capacitor 312. The bridge circuit 304 comprises impedances 320a and 320d ($Z_1$), impedances 320b and 320c ($Z_2$) and resistances 322a–b (R). The transformer 306 comprises main inductance 324 ($L_2$), leakage inductance 326 ($L_1$), primary coil 328, secondary coils 330a–b and DC decoupling capacitors 332a–b. A bypass switch 334 is coupled across the DC decoupling capacitor 332b to remove the DC decoupling capacitor 332b from the signal path when activated. The transmitter 302 can be a stand-alone device or part of a transceiver, which also includes receiver circuitry. The transmitter 302 can also be located external to the modem 200, for supplying line-probing signals directly to the transmission line or via an external port in the modem 200.

The DC decoupling capacitors 308a–b are coupled to the positive terminals of the line drivers 310a–b, respectively, for decoupling low frequency DC input signals from the signal path. Feedback resistors 314a–b are coupled to the outputs of the line drivers 310a–b and to the inverted inputs of the line drivers 310a–b, respectively. The resistive values of the feedback resistors 314a–b are selected to provide a desired output gain for the line drivers 310a–b. The line drivers 310a–b can be operational amplifiers, but any combination of known circuit elements and configurations can be used to perform the functions of the line drivers 310a–b. The filter capacitor 312 is coupled in series with the filter resistor 316 and provides a high pass filter at the inputs of the line drivers 310a and 310b. Bypass switch 318 provides a shorting path across the filter capacitor 312, effectively removing the high pass filter from the signal path. The line drivers 310a–b are used to drive the transformer output lines 336a and 336b, and filter capacitor 312 and filter resistor 316 provide a high pass filter that blocks low frequency input signals (e.g., <100 KHz) from entering the receiver lines 338a–b.

The impedances 320a–d and resistances 322a–b of the bridge circuit 304 are selected to provide impedance matching between the transmitter 302 and the transformer 306, and to ensure maximum power transfer. The bridge circuit 304 can be a stand-alone device or integrated into the transmitter/transceiver or transformer circuitry, and can be implemented with one or more passive and active devices arranged in parallel and/or series. Receiver lines 338a–b couple the bridge circuit 304 to a receiver (not shown). The bridge circuit 304 provides a 4-to-2-wire interface between the transformer 306, the transmitter 302 and the associated receiver (not shown).

The bridge circuit 304 is coupled to a primary side of the transformer 306. The primary side of the transformer 306 includes the primary coil 328, which is modeled by the leakage inductance 326 in series with the parallel combination of the main inductance 324 and the primary coil 328. The primary coil 328 is magnetically coupled to the secondary coils 330a–b located on the secondary side of the transformer 306. The turn ratio of the primary coil 328 and the secondary coils 330a–b can be 1:n. The value n depends on factors such as desired line voltage and the specifications of one or more components included in the modem 200. The secondary coils 330a–b are coupled together in series by the DC decoupling capacitor 332a during normal operation and the parallel combination of DC decoupling capacitors 332a and 332b during SELP mode. The outer ends of the secondary coils 330a–b are coupled to transformer lines 336a–b. The transformer lines 336a–b can be coupled directly to the phone lines 216 or, alternatively, to a splitter 204, as described with respect to FIG. 4. Any number and combination of primary and secondary coils can be used to construct a transformer in accordance with the principles of the present invention.

Figure 4:
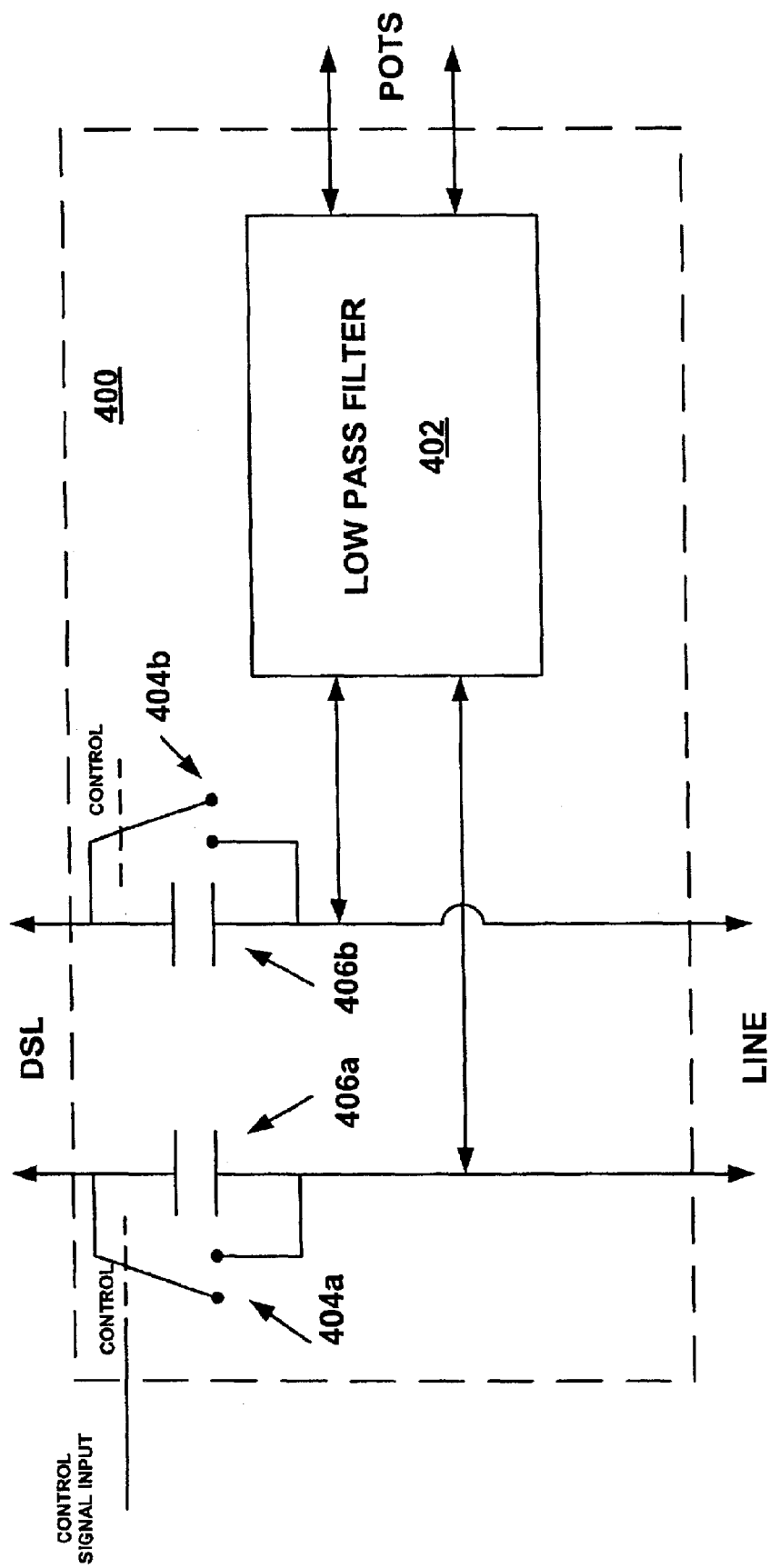
FIG. 4 is a block diagram of a splitter in accordance with one embodiment of the present invention.

Referring to FIG. 4, there is shown a block diagram of a splitter 400 for use with the hybrid circuit 300 in accordance with one embodiment of the present invention. The splitter 400 includes low pass filter 402, bypass switches 404a–b and DC decoupling capacitors 406a–b. The DC decoupling capacitors 406a–b, which are serially coupled to the transformer lines 336a–b (FIG. 2), block low frequency signals from entering the modem 200 during normal operation. During SELP mode, the bypass switches 404a–b are closed, thereby removing the DC decoupling capacitors 406a–b from the signal path. As such, low frequency probing signals are allowed to access the transmission line. The switches 406a–b are controlled by a control signal that is activated when SELP mode is entered. The control signal can be triggered, for example, in response to receiving and decoding a SELP mode enable/request signal transmitted by a remote modem (e.g., pilot tone, handshaking message, or through Embedded Operation Channel (EOC) designated as SELP mode enable/request signal). Alternatively, the control signal can be provided by or otherwise triggered by a local processor (e.g., processor 206) in response to receiving a request to enter SELP mode. Such request may come from, for example, the local network operator or management entity. Alternatively, the request may be self-initiated by modem 200 in response to detecting a particular condition, such as a repeated link failure in data mode.

Operation of Hybrid Circuit

The hybrid circuit 300 is capable of running in at least two modes of operation: normal operation and SELP mode. In normal operation, the modem 200 transmits and receives high frequency DSL data signals to and from a transmission medium (e.g., copper twisted pair) or other subscriber loop, while blocking low frequency signal access to the transmission medium. In SELP mode, the modem transmits low frequency line-probing signals to the transmission line to estimate its loop length. Thus, the hybrid circuit 300 can accommodate both high frequency and low frequency signals at different times depending on the mode of operation.

In one embodiment of the present invention, the bypass switch 318 located in transmitter 302 is open during normal operation. When the switch 318 is open, the high pass filter (filter capacitor 312, filter resistor 316) blocks low frequency signals from entering the bridge circuit 304 and onto receiver lines 338a, 338b. When the switch 318 is closed during SELP mode, the high pass filtering effect of capacitor 312 is removed from the signal path, allowing low frequency signals (e.g., probing signals) to propagate through the hybrid circuit 300 and onto the transmission line.

In one embodiment of the present invention, the bypass switch 334 in transformer 306 is open during normal operation. When the switch 334 is open during normal operation, the DC decoupling capacitor 332a blocks low frequency signals from entering or leaving the modem 200. In SELP mode, the switch 334 is closed and at least one DC coupling capacitor 332b is added in parallel with at least one smaller DC decoupling capacitor 332a, providing an overall decrease in input impedance to low frequency signals (e.g., 10 Hz<f<100 KHz). In one embodiment, the capacitance value of capacitor 332b is 10 to 100 times greater than the capacitance value of capacitor 332a. For example, if the value of capacitor 332a is about 30 nf, the value of capacitor 332b might be in the range of 300 nf to 3 $\mu$f. Regardless of the actual values of capacitors 332a–b, in SELP mode, low frequency probing signals are allowed to propagate through the transformer and onto the transmission line.

In another embodiment of the present invention, both sides of capacitor 332a are shorted by switch 334, eliminating the need for capacitor 332b.

Note that while in the SELP mode, the switches 340a–b connecting the receiver input lines 338a–b to return lines 342a–b are closed. Thus, line-probing signals received from the transmission line are coupled directly to the receiver (not shown), bypassing the bridge circuit 304. If the hybrid circuit 300 includes a splitter 400, then the bypass switches 404a–b are also closed during SELP mode to allow low frequency line-probing signals to access the transmission line.

The hybrid circuit 300 described above can be reconfigured (e.g., in response to control signals from processor 206) to operate in SELP mode by activating switches 318, 340a–b and 334. The switches 318, 340a–b and 334 represent one method of reconfiguring the hybrid circuit 300 to handle low frequency line-probing signals in SELP mode. Numerous switching schemes and techniques can be employed as will be apparent in light of this disclosure, including the use of any number or type of switches configured to be either normally open or normally closed during SELP mode. Also, any number or types of capacitors can be coupled together in series and/or parallel to provide the desired DC coupling capacitance. Likewise, active impedance synthesis circuits can be used to increase the value of the DC blocking capacitor 332a. Also, the return lines 342a–b for receiving the received line probing signals can be coupled to different parts of the hybrid circuit 300 (e.g., after the bridge circuit 304 at the output of the transmitter 302), but this may require additional circuitry and/or software (e.g., switch control) at the receiver.

Loop Length Estimation & Load Coil Detection

Figure 5:
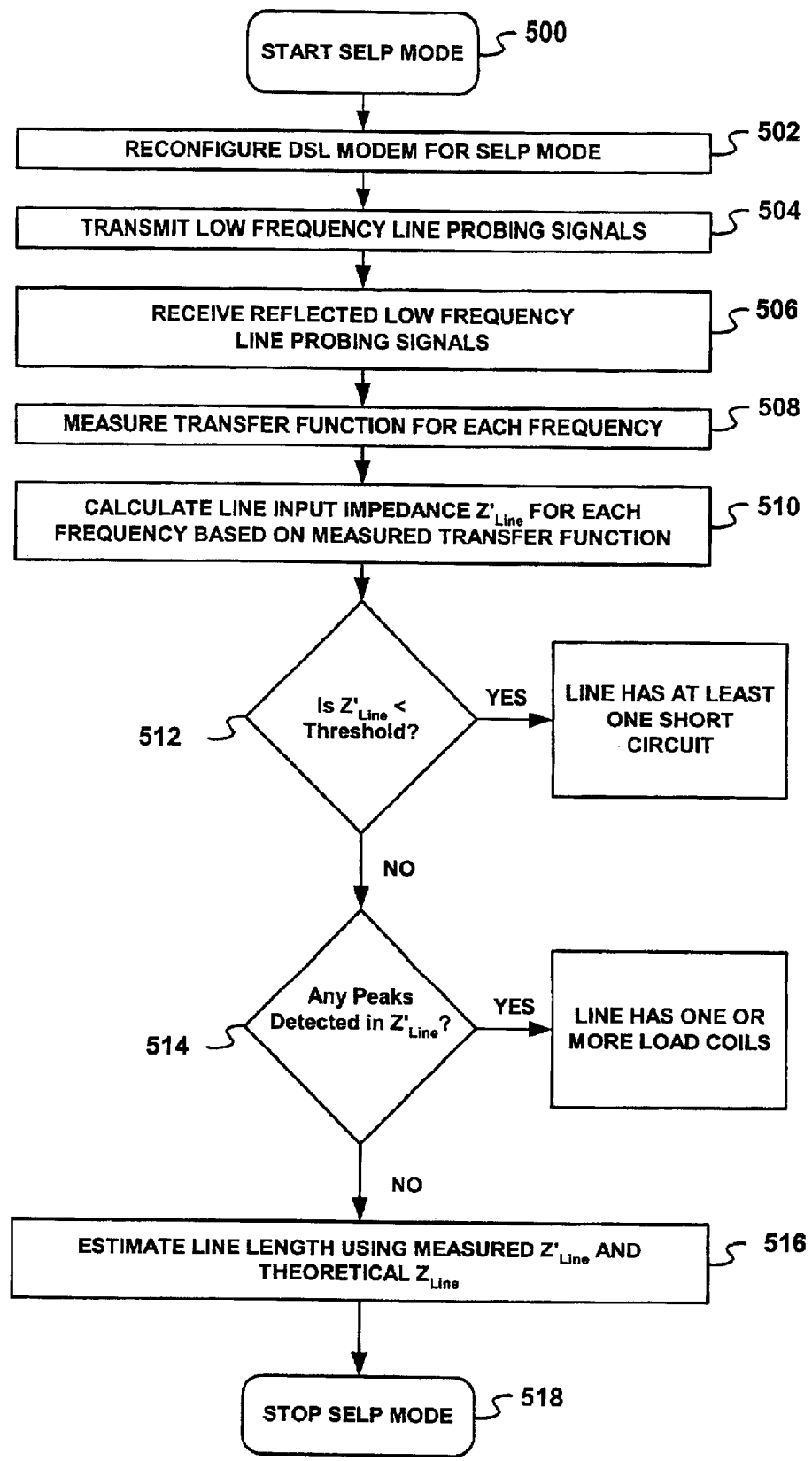
FIG. 5 is a flow diagram of a SELP method in accordance with one embodiment of the present invention.

Referring to FIG. 5, there is shown a flow diagram of a SELP method in accordance with one embodiment of the present invention. This method can be carried out, for example, by a CO modem configured as described in reference to FIGS. 2, 3 and 4. The SELP method begins when the SELP device (e.g., DSL modem 200) enters 500 SELP mode in response to a request, for example, by a system operator located at the CO or an application running on a host at a remote site. This could occur during service qualification on either an individual or bulk basis. Alternatively, the SELP device can be programmed to automatically run SELP mode during, for example, an initialization phase. After starting 500 the SELP mode, the DSL modem is reconfigured 502 to SELP mode, thereby allowing low frequency line-probing signals access to the transmission line. If hybrid circuit 300 is employed, then bypass switches 318, 340a–b and 334 are closed, as discussed in reference to FIG. 3. If a splitter (e.g., splitter 400) is included in the system, then bypass switches 406a–b will be closed as well.

After reconfiguring 502 the SELP device, the SELP device transmits 504 a sequence of line probing signals by sweeping the frequency of a transmit signal in the operating band of the hybrid circuit (e.g., below 1 MHz). In one embodiment, samples of the transmitted line-probing signals are kept in a storage device (e.g., EEPROM or other memory device) accessible by a processor (e.g., processor 206) included in the SELP device. Upon receiving a request to initiate a line probing sequence, the processor accesses the samples from the storage device, which can then be converted to analog form and driven onto the transmission line. Alternatively, a processor triggers a signal generator, providing the line probing signals. The line probing signal frequency can be selected from an arbitrary set of frequencies (hereinafter also denoted by F). These frequencies can be selected equally spaced in a linear scale or log scale. The frequency step size of the line probing signals is selected to achieve a predetermined accuracy (e.g., 100 Hz steps). In one embodiment, the type of waveform used for the line probing signals is sinusoidal, but any waveform can be used, including but not limited to, square waves, triangular waves and any combination of such waveforms.

Each transmitted line probing signal travels the length of the transmission line and is reflected back to the transmit node (e.g., CO), where it is received by the SELP device (e.g., modem 200). This reflection will occur regardless of whether the opposite end of the transmission line is terminated at the CPE location. Each reflected line probing signal is measured 508 at the DSL modem receiver (e.g., via line probing receive lines 342a–b) and a transfer function is computed from the ratio of the received (reflected version) line probing signal to the transmitted line probing signal, and is denoted by $$H_p(s) = S_R(s)/S_T(s). \quad (1)$$

In general, the transfer function $H_p(s)$ is a function of the line impedance $Z'_{Line}(s)$ and other circuit elements. Assuming the other circuit elements are measured and known to the processor 206 (which is typically the case), the dependency of $H_p(s)$ to $Z'_{Line}(s)$ is expressed as $$H_p(s) = f(Z'_{Line}(s)) \quad (2)$$

The line impedance $Z'_{Line}(s)$ is estimated 510 from $H_p(s)$ for one or more frequencies f in a set of frequencies F. In general, the estimation process can be defined as:

$$Z'_{Line}(s) = f^{-1}(H_p(s)) \quad (3)$$

where $f^{-1}$ is the inverse function.

In one embodiment, the transfer function $H_p(s)$ and line impedance $Z'_{Line}(s)$ is computed in a digital signal processor (e.g., processor 206) as follows:

$$Z'_{Line}(s) = n^2 \bigg/ \left( \frac{1}{2R/(1/H_p(s) - 1) - L_{1,est}(s)} - \frac{1}{L_{2,est}(s)} \right), \quad (4)$$

where R is the termination impedance of the hybrid circuit 300, $L_{1,est}$ and $L_{2,est}$ are the estimated leakage and main inductance of transformer 306, respectively, and n is the turn ratio of the transformer 306. In deriving Equation (4), the series resistance of the transformer 306 was ignored. In another embodiment, however, the series resistance of the transformer 306 can be included as well. While Equation (4) is expressed in Laplace notation (the "s-domain"), in practice it can be computed using a Fast Fourier Transform (FFT) algorithm, noting that $s=j2\pi f$. The location of the measured line impedance $Z'_{Line}(s)$ in the hybrid circuit 300 is shown in FIG. 3, and represents the line impedance as seen by the transmitter.

Having determined the line impedance $Z'_{Line}(s)$ for one or more frequencies f in the set of frequencies F, several characteristics of the transmission line can be identified. These characteristics include the existence of a short circuit in the transmission line or the existence of one or more load coils in the line. For example, if the line impedance $Z'_{Line}(s)$ is less than 512 a predetermined threshold, then at least one short circuit exists in the transmission line. Also, the number of peaks detected 514 in the line impedance is equal to the number of load coils in the transmission line. Load coils are generally used to enhance voice transmission over a telephone line. The load coils are typically series inductors (e.g., 44 mH) placed at 6 Kft intervals along a transmission line, for providing a flatter frequency response across the voice band. Since DSL service typically cannot be deployed on lines having load coils, identifying the presence of load coils is a desired step in qualifying a transmission line for DSL service.

Once the measured line impedances are determined 510, the estimated loop length $L_{est}$ is estimated 516 based on the difference between the measured line impedance $Z'_{Line}(f)$ and predetermined line impedances $Z'_{Line}(f)$ as follows:

$$L_{est} = \arg\min \sum_{f \in F} |Z'_{Line}(f) - Z_{Line}(f)|^n, \quad (5)$$

where n is an integer (e.g., 2), F is a frequency interval for which the RC model for the transmission line is valid, for example, f<100 KHz. $Z'_{Line}(f)$ is the line impedance computed in Equation (4) with $s=j2\pi f$. $Z_{Line}(f)$ is a predetermined line impedance at frequency f, which can be calculated from known values as follows:

$$Z_{Line}(f) = \frac{1}{j2\pi f c_\infty L} + r_{oc} L \quad (6)$$

where $c_\infty$ and $r_{oc}$ are constants, which are functions of the wire gauge used for the particular transmission line.

For example, for a 26 American Wire Gauge (AWG) line, $c_\infty = 49$ nF/Km and $r_{oc} = 286.189$ Ω/Km. The values for $c_\infty$ and $r_{oc}$ can be stored in a look-up table in computer-readable medium (e.g., EEPROM or flash memory) accessible by a processor (e.g., processor 206). Since the constants $c_\infty$ and $r_{oc}$ do not change significantly from one wire-type to another, average values among different wire-types for each of the constants $c_\infty$ and $r_{oc}$ can be used without degrading the accuracy of the measurement. The range of values for loop length L can be selected to cover the range of interest, for example, the range necessary for DSL loop qualification (e.g., 1 Kft to 20 Kft). The step size of loop length L will determine the size of the look-up table. To reduce the size of the look-up table, a larger step size can be used in conjunction with real-time interpolation to get finer step size values. In any event, the step size can be judiciously selected to provide the desired resolution with the accuracy range of the measurements. The look-up table need not be resident in the modem 200, but can reside, for example, in a database in the CO and accessible to the modem 200 during SELP mode.

After the estimated line length is determined using Equation (5), the SELP mode terminates 518 and the estimated line length $L_{est}$ can be stored in local memory or other storage device (local or external), for retrieval and/or further processing. In DSL systems, the estimated line length can be provided to a network operator to assist in determining whether DSL-based service can be provided on that particular line (e.g., subscriber loop).

In one embodiment of the present invention, line impedances $Z'_{Line}(f)$ are computed during SELP mode over the frequency set F and stored in memory along with predetermined values $c_\infty$ and $r_{oc}$. Equation (5) is then used to calculate the mean-squared error $MSE_1$ for loop length L over the frequency set F and stored in memory. Upon completion of this calculation, a second mean-squared error $MSE_2$ is calculated over the frequency set F and compared against $MSE_1$. The smaller of $MSE_1$ and $MSE_2$ is stored in memory for comparison against the next calculated mean-squared error $MSE_3$ over the frequency set F. This process continues for each loop length L in the look-up table, until the look-up table is exhausted and the lowest mean-squared error is determined. The loop length L that corresponds to the lowest mean-squared error is the estimated line loop $L_{est}$.

While Equation (5) preferably uses a mean-squared error calculation (n=2), other error calculation techniques are equally applicable to the present invention for comparing the estimated line impedance $Z'_{Line}$ and the predetermined line impedance $Z_{Line}$, including but not limited to, error calculation techniques based on various known methods having various degrees or orders (e.g., maximun likelihood). Also, it is not necessary to compute all mean-squared errors for all loop lengths L in the look-table. Rather, a subset of loop lengths can be selected based on other available information, including but not limited to loop make-up data typically found in loop records or loop inventory systems, such as databases managed by Loop Facilities Assignment Centers (LFACS). Also, single-ended measurements of line characteristics for POTS transmission (e.g., using MLT, 4TEL) can also be used in conjunction with the present invention to determine a subset of loop lengths L to process during SELP mode for faster convergence to the estimated loop length $L_{est}$.

Figure 6:
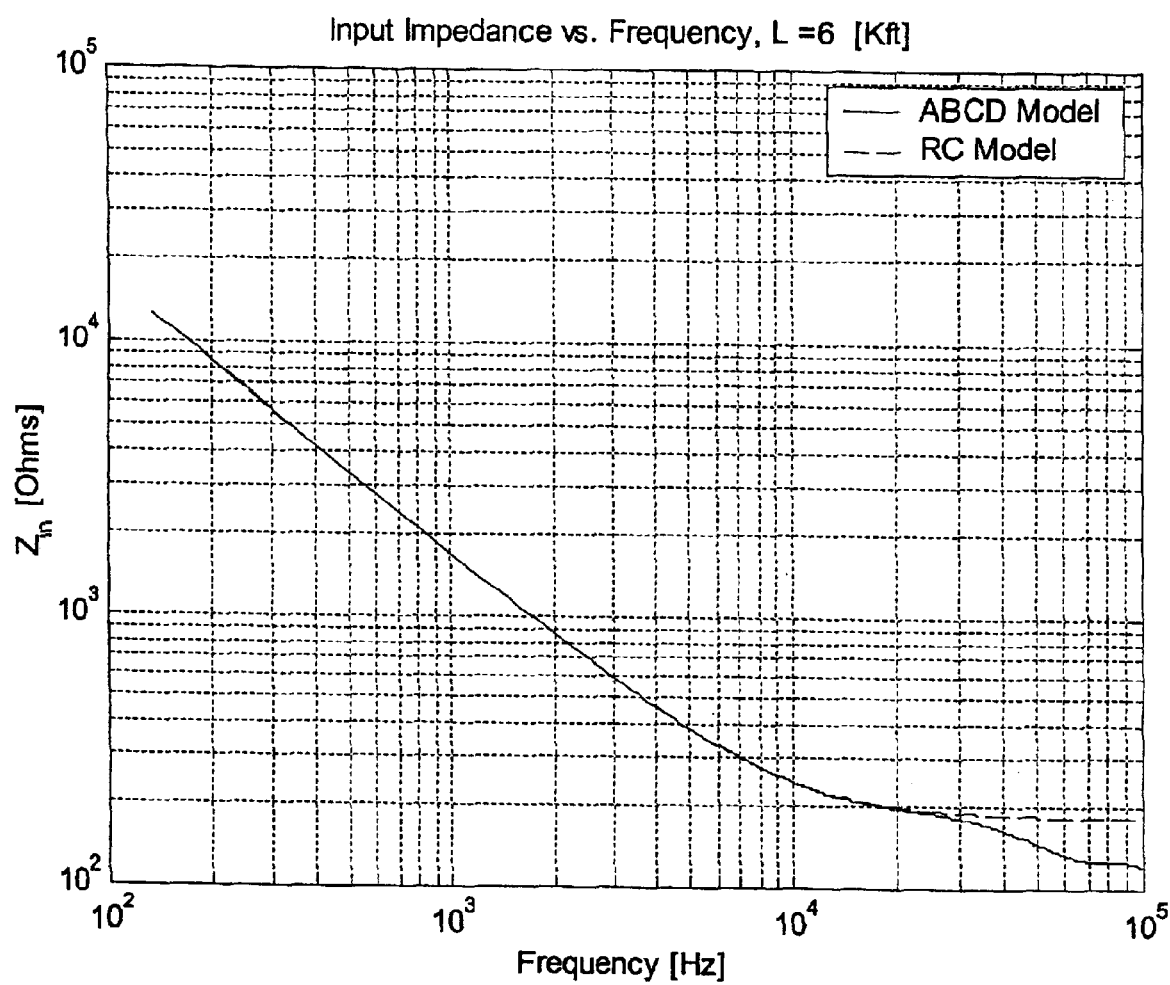
FIG. 6 is a graph illustrating line impedance versus frequency based on the hybrid circuit shown in FIG. 3.

Referring to FIG. 6, there is shown a graph of the line impedance $Z'_{Line}$ (ohms) versus frequency (Hz) for a loop length L=6 Kft. The line impedance $Z'_{Line}$ was simulated using both an RC model and an ABCD model in accordance with the principles of the present invention. The interested reader can refer to J. J. Werner, "The HDSL Environment," IEEE Journal on Selected Areas in Communications, Vol. 9, No. 6, August 1991, pp. 785–800 or Thomas Starr et al., "Understanding Digital Subscriber Line Technology," Prentice Hall, 1999, pp. 64–84, for a more detailed discussion of "ABCD" theory as applied to DSL systems. It is clear from FIG. 6 that the ABCD model of the hybrid circuit 300 closely matches the RC model for estimates of line impedance $Z'_{Line}$ within the operating band of the hybrid circuit 300 (e.g., f<100 KHz).

Figure 7:
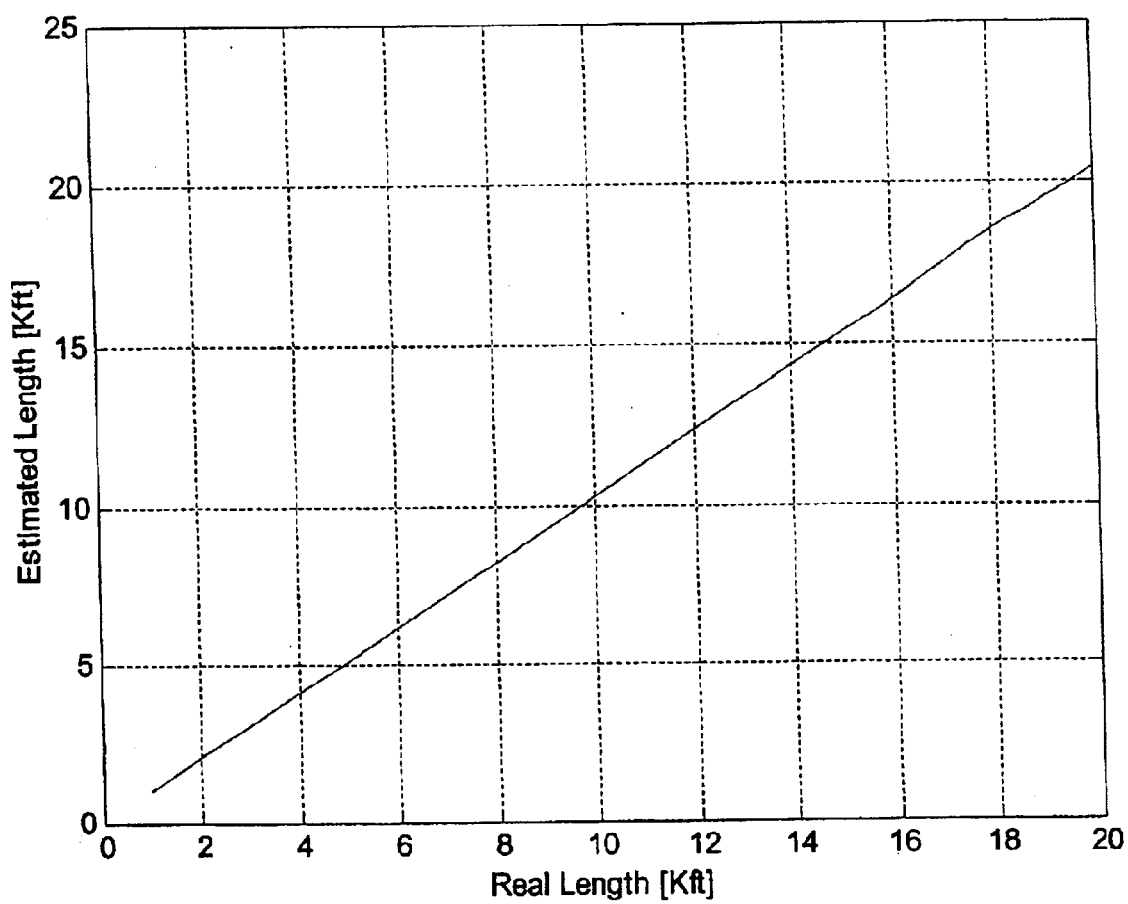
FIG. 7 is a graph illustrating estimated line length versus real line length based on the hybrid circuit shown in FIG. 3.

Referring to FIG. 7, there is shown a graph of estimated loop length $L_{est}$ (Kft) versus real line length L (Kft), in accordance with one embodiment of the present invention. It is clear from FIG. 7 that the estimated line length determined from Equation (5) provides an accurate estimate of line length $L_{est}$ in the range of about 1 Kft to 20 Kft.

Figure 8:
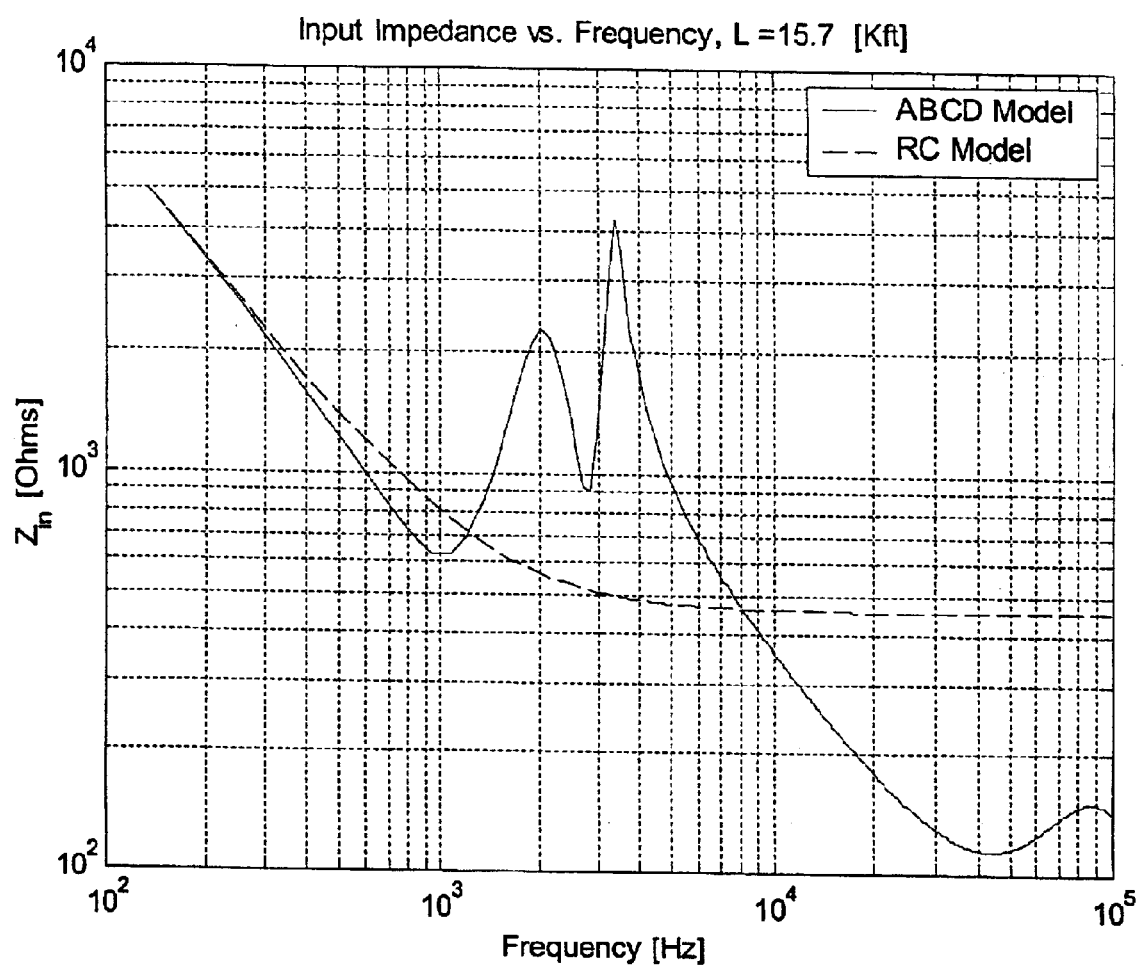
FIG. 8 is a graph showing line impedance versus frequency based on the hybrid circuit shown in FIG. 3, indicating the detection of load coils.

Referring to FIG. 8, there is shown a graph of simulated line impedance (ohms) versus frequency (Hz), in accordance with one embodiment of the present invention. The simulated line impedance $Z'_{Line}$ is shown in FIG. 8 for RC and ABCD models. The line simulated is composed of three line segments: 3 Kft, 6 Kft and 6 Kft, separated by load coils. The number of load coils is equal to the number of peaks in FIG. 8 (e.g., two peaks so 2 load coils detected). In one embodiment, the measured line impedance $Z'_{Line}$ is used to estimate the line length beyond the load coils, due to the low frequency nature of the probing signals used to make the measurement. Using Equation (5), $L_{est}$=15.7 Kft, which is a close approximation of the actual total length (15 Kft) of the combined transmission medium segments.

Other Embodiments

The above description is included to illustrate the operation of the preferred embodiments and is not meant to limit the scope of the invention. Rather, the scope of the invention is to be limited only by the claims. From the above discussion, many variations will be apparent to one skilled in the relevant art that would yet be encompassed by the spirit and scope of the invention.

For example, the line input impedance $Z'_{Line}$ can be estimated using other transfer function derived from hybrid circuit 300. The line input impedance $Z'_{Line}$ can be derived from the receiver input measurement and Equation (7) below:

$$H_{hyb} = \frac{1}{n}\left(\frac{Z_2}{Z_1 + Z_2} - \frac{Z_1}{Z_1 + Z_2}\frac{Z'_{Line}}{Z'_{Line} + 2R_1}\right)H_{LD}, \tag{7}$$

wherein, $H_{LD}$ is the transfer function of the transmitter 302 (e.g., the high pass filter shown in FIG. 3) and $Z_1$ and $Z_2$ are impedance of the bridge circuit 304 and have values $Z_1=R_1+j\omega C_1$, $Z_2=R_2$, respectively. Once the line impedance $Z'_{Line}$ is known, the loop the length $L_{est}$ can be estimated using Equation (5).

What is claimed is:

1. A method of estimating the length of a transmission medium, comprising:

transmitting a probe signal from a DSL modem over the transmission medium;

measuring a reflected version of the probe signal received by the DSL modem from the transmission medium;

determining transmission medium impedance from the transmitted probe signal and the reflected version of the probe signal;

comparing the transmission medium impedance to a plurality of predetermined impedances, each predetermined impedance associated with a known transmission medium length; and estimating the length of the transmission medium based on the comparison.

2. The method of claim 1, wherein the transmission medium is a subscriber loop in a DSL system.

3. The method of claim 1, wherein the impedance of the transmission medium is computed from a ratio of the reflected version of the probe signal to the transmitted probe signal.

4. The method of claim 1, wherein the impedance of the transmission medium is compared to the predetermined impedances over a range of frequencies.

5. The method of claim 1, wherein the comparing includes:

selecting one from the plurality of predetermined impedances based on a predetermined selection criteria and the estimated length of the transmission medium is the known transmission medium length associated with the selected predetermined impedance.

6. The method of claim 1, wherein a difference between the impedance of the transmission medium and each of the predetermined impedances is determined over a set of frequencies, and the known transmission medium length associated with the predetermined impedance having the smallest difference is the estimated length.

7. The method of claim 6, wherein the difference is determined by taking the mean-squared error between the impedance of the transmission medium and the predetermined impedance.

8. The method of claim 1, further comprising:

identifying at least one load coil coupled to the transmission medium by detecting a peak in the impedance of the transmission medium.

9. The method of claim 1, further comprising:

identifying a short circuit in the transmission medium by comparing the impedance of the transmission medium to a predetermined threshold.

10. The method of claim 1, wherein the estimated length of the transmission medium is calculated from the impedance of the transmission medium and predetermined impedances over a range of frequencies using the equation, $$L_{est} = \arg \min \sum_{f \in F} |Z'_{Line}(f) - Z_{Line}(f)|^n,$$

wherein, n is a positive integer, $L_{est}$ is the estimated length of the transmission medium, $Z'_{Line}(f)$ is the impedance of the transmission medium and $Z_{Line}(f)$ is the predetermined impedance, and F is the range of frequencies.

11. A system for estimating the length of a transmission medium, comprising:

a transformer coupled to the transmission medium, for coupling signals to the transmission medium;

a transmitter operatively coupled to the transformer and configured to transmit a probe signal over transmission medium;

a receiver operatively coupled to the transformer and configured to receive a reflected version of the probe signal; and a processor operatively coupled to the receiver and configured to estimate the length of the transmission medium by determining a transmission medium impedance based on the transmitted probe signal and the reflected version of the probe signal, comparing the transmission medium impedance to a plurality of predetermined impedances, wherein each predetermined impedance is associated with a known transmission medium length, and estimating the length of the transmission medium based on the comparison.

12. The system of claim 11, wherein prior to transmission of the probe signal, the transformer is reconfigured to pass the frequency of the probe signal.

13. The system of claim 11, wherein prior to transmission of the probe signal, the transmitter is reconfigured to pass the frequency of the probe signal.

14. The system of claim 11, wherein the impedance of the transmission medium is determined by the equation, $$Z_{Line}(s) = f^{-1}(H_p(s)),$$

where $H_p(s)$ is determined from the ratio of the transmitted probe signal and the reflected version of the probe signal.

15. The system of claim 11, wherein the impedance of the transmission medium is determined by the equation, $$Z'_{Line}(s) = n^2 / \left( \frac{1}{2R/(1/H_p(s)-1) - L_{1,est}(s)} - \frac{1}{L_{2,est}(s)} \right),$$

wherein, n is the turn ratio for the transformer, R is a termination impedance, $H_p(s)$ is determined from the ratio of the transmitted probe signal and the reflected version of the probe signal, $L_{1,est}$ is an estimate of leakage inductance of the transformer, and $L_{2,est}$ is an estimate of main inductance of the transformer.

16. The system of claim 11, wherein the impedance of the transmission medium is determined by the equation, $$H_{hyb} = \frac{1}{n} \left( \frac{Z_2}{Z_1+Z_2} - \frac{Z_1}{Z_1+Z_2} \frac{Z'_{Line}}{Z'_{Line}+2R_1} \right) H_{LD},$$

wherein, n is the turn ratio for the transformer, $Z_1=R_1+j\omega C_1$, $Z_2=R_2$ and $H_{LD}$ is a transfer function of the transmitter.

17. The system of claim 11, further comprising a splitter coupled to the transformer, the splitter comprising bypass circuitry for providing the probe signal access to the transmission medium in response to a control signal.

18. A computer-readable medium having stored thereon instructions which, when executed by a processor, cause the processor to perform the steps of:

measuring a reflected version of a transmitted probe signal received by a DSL modem from a transmission medium;

determining a transmission medium impedance based on the transmitted probe signal and the reflected version of the probe signal;

comparing the transmission medium impedance to a plurality of predetermined impedances, each predetermined impedance associated with a known transmission medium length; and estimating the length of the transmission medium based on the comparison.

19. The computer-readable medium of claim 18, wherein the transmission medium is a subscriber loop in a DSL system.

20. The computer-readable medium of claim 18, wherein the impedance of the transmission medium is determined from a ratio of the reflected version of the probe signal to the transmitted probe signal.

21. The computer-readable medium of claim 18, wherein the impedance of the transmission medium is compared to the predetermined impedances over a range of frequencies.

22. The computer-readable medium of claim 18, wherein the comparing includes:

selecting one from the plurality of predetermined impedances based on predetermined selection criteria, and the length of the transmission medium is the known transmission medium length associated with the selected predetermined impedance.

23. The computer-readable medium of claim 22, wherein a difference between the impedance of the transmission medium and each of the predetermined impedances is determined over a set of frequencies, and the known transmission medium length associated with the predetermined impedance having the smallest difference is the estimated length.

24. The computer-readable medium of claim 23, wherein the difference is determined by taking the mean-squared error between the impedance of the transmission medium and the predetermined impedance.

25. The computer-readable medium of claim 18, further comprising:
 identifying at least one load coil coupled to the transmission medium by detecting a peak in the impedance of the transmission medium.

26. The computer-readable medium of claim 18, further comprising:
 identifying a short circuit in the transmission medium by comparing the impedance of the transmission medium to a predetermined threshold.

27. The computer-readable medium of claim 18, wherein the estimated length of the transmission medium is calculated from the impedance of the transmission medium and predetermined impedances over a range of frequencies using the equation, $$L_{est} = \arg\min \sum_{f \in F} |Z'_{Line}(f) - Z_{Line}(f)|^n,$$

wherein, n is a positive integer, $L_{est}$ is an estimated length of the transmission medium, $Z'_{Line}(f)$ is an impedance of the transmission medium and $Z_{Line}(f)$ is a predetermined impedance, and F is a range of frequencies.

28. A system for estimating the length of a transmission medium, comprising:
 means for measuring a reflected version of a transmitted probe signal received from a transmission medium;
 means for determining a transmission medium impedance from the transmitted probe signal and the reflected version of the probe signal;
 means for comparing the transmission medium impedance to a plurality of predetermined impedances, each predetermined impedance associated with a known transmission medium length; and
 means for estimating the length of the transmission medium based on the comparison.

29. A method of estimating the length of a transmission medium in a Digital Subscriber Line (DSL) system, comprising:
 transmitting a probe signal over the transmission medium by way of a transformer coupled to the transmission medium;
 measuring a reflected version of the probe signal received from the transmission medium;
 determining a transfer function characterizing the transmission medium and the transformer based on the transmitted probe signal and the reflected version of the probe signal; and
 estimating the length of the transmission medium based on the transfer function.

30. A Digital Subscriber Line (DSL) modem for estimating the length of a transmission medium, comprising:
 a transformer coupled to the transmission medium, for coupling signals to the transmission medium;
 a transmitter operatively coupled to the transformer and configured to transmit a probe signal over transmission medium;
 a receiver operatively coupled to the transformer and configured to receive a reflected version of the probe signal; and
 a processor operatively coupled to the receiver and configured to estimate the length of the transmission medium by determining a transfer function characterizing the transmission medium and the transformer based on the transmitted probe signal and the reflected version of the probe signal; and estimating the length of the transmission medium based on the transfer function.

31. A computer-readable medium having stored thereon instructions which, when executed by a processor, cause the processor to perform the steps of:
 transmitting a probe signal over the transmission medium by way of a transformer coupled to the transmission medium;
 measuring a reflected version of the probe signal received from the transmission medium;
 determining a transfer function characterizing the transmission medium and the transformer based on the transmitted probe signal and the reflected version of the probe signal; and
 estimating the length of the transmission medium based on the transfer function.

32. The DSL modem of claim 11, wherein the transfer function is, $$H_p = \frac{\frac{Z_{Line}}{n^2}\|L_2 s + L_1 s}{\left(\frac{Z_{Line}}{n^2}\|L_2 s\right) + L_1 s + 2R} H_{LD},$$

where $H_{DL}$ is a transfer function of the transmitter, $L_1$ is a transformer leakage inductance, $L_2$ is a transformer main inductance, R is a termination impedance and $Z_{Line}$ is a transmission medium impedance.

* * * * *

UNITED STATES PATENT AND TRADEMARK OFFICE
CERTIFICATE OF CORRECTION

PATENT NO. : 6,876,725 B2
DATED : April 5, 2005
INVENTOR(S) : Farrokh Rashid-Farrokhi and Jalil Kamali It is certified that error appears in the above-identified patent and that said Letters Patent is hereby corrected as shown below:

Column 12,
Line 4, please replace the equation with
-- $Z'_{Line}(s) = f^{-1}(H_p(s))$ --.

Signed and Sealed this

Twenty-third Day of August, 2005

JON W. DUDAS
*Director of the United States Patent and Trademark Office*